US012070112B1

(12) United States Patent
Kane

(10) Patent No.: US 12,070,112 B1
(45) Date of Patent: Aug. 27, 2024

(54) INTERCHANGEABLE CLAMPING PLATE FOR SOFT GOODS

(71) Applicant: The Ridge Wallet LLC, Santa Monica, CA (US)

(72) Inventor: Daniel Kane, Agoura Hills, CA (US)

(73) Assignee: The Ridge Wallet LLC, Santa Monica, CA (US)

( * ) Notice: Subject to any disclaimer, the term of this patent is extended or adjusted under 35 U.S.C. 154(b) by 0 days.

(21) Appl. No.: 18/418,085

(22) Filed: Jan. 19, 2024

(51) Int. Cl.

| | |
|---|---|
| ***A45C 13/00*** | (2006.01) |
| ***A45C 13/08*** | (2006.01) |
| ***G09F 23/00*** | (2006.01) |
| *A45F 3/00* | (2006.01) |
| *G09F 7/18* | (2006.01) |

(52) U.S. Cl.
CPC ............ *A45C 13/001* (2013.01); *A45C 13/08* (2013.01); *G09F 23/00* (2013.01); *A45F 2003/001* (2013.01); *G09F 7/18* (2013.01)

(58) Field of Classification Search
CPC ..... A45C 13/001; A45C 13/008; G09F 23/00; G09F 7/18; G09F 7/02; A45F 2003/001; A44C 3/001
See application file for complete search history.

(56) References Cited

U.S. PATENT DOCUMENTS

| | | | | |
|---|---|---|---|---|
| 3,009,381 | A * | 11/1961 | Rapata | G09F 7/18 40/668 |
| 9,990,867 | B1 * | 6/2018 | Shiao | G09F 7/18 |
| 2009/0205235 | A1 * | 8/2009 | Scicluna | G09F 3/16 40/6 |
| 2015/0221243 | A1 * | 8/2015 | French | G09F 7/02 40/662 |
| 2021/0212429 | A1 * | 7/2021 | Josifov | A45C 13/08 |

* cited by examiner

*Primary Examiner* — Gary C Hoge
(74) *Attorney, Agent, or Firm* — K&L Gates LLP; Brian J. Novak; Giorgios N. Kefallinos

(57) ABSTRACT

A device, comprising a first plate, a second plate, a third plate, a plurality of permanent fasteners, and a plurality of removable fasteners, wherein the permanent fasteners are configured such that the permanent fasteners secure the first plate to the second plate the removable fasteners are configured such that the removable fasteners rigidly secure the second plate to the third plate. The device permits a user to customize an article, such as a piece of luggage, with a customized third plate (e.g., bearing a user's name) which may be affixed to the article and later removed from the article as desired. The device disclosed herein thus, in some embodiments, may take the form of a removable, replaceable nameplate.

20 Claims, 16 Drawing Sheets

INTERCHANGEABLE CLAMPING PLATE FOR SOFT GOODS

BACKGROUND

Logo plates are typically a semi-permanent addition to an accessory or piece of luggage, often riveted or sewn into the fabric.

SUMMARY

The present disclosure provides an interchangeable clamping logo plate for fabrics and other soft or semi-soft goods. The design includes two clamping plates, which are positioned on either side of a piece of fabric or other semi-rigid material and fastened together, thereby clamping the fabric or other semi-rigid material. A third plate is then be attached to a clamping plate, on which a logo, or other media can appear.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides an interchangeable plate assembly for attachment to a flexible material, such as a woven or nonwoven textile, plastic, leather, or other soft goods, in which the plate assembly attaches securely to the flexible material, such as a bag or piece of luggage, and provides a surface for the display of pertinent indicia, such as branding or other forms of identification. The present disclosure may be affixed to, for example, a piece of luggage that has a soft or semi-soft outer layer and a more rigid inner layer, or may have a more rigid construction overall. The three-plate design provides improved security of the attachment, with a first set of rivets clamping the fabric or similar material securely between two clamping plates, and a second set of fasteners securing the indicia plate to the clamping plate assembly. The indicia plate is designed to be interchangeable with other indicia plates displaying different indicia. The clamping plates are further designed for strength and rigidity, so as to reduce the risk of (or prevent) the clamping plates from bending due to routine wear and tear. Additionally, the design reduces the effect of the plate assembly on the use of the accessory to which the plate assembly is attached, namely by reducing the thickness and space occupied in a storage area of the soft good, so as to prevent the assembly from becoming cumbersome, uncomfortable, or otherwise unsightly.

In some of the Figures of the present disclosure, a shared coordinate system is used (as indicated with the compasses in individual Figures) with X, Y, and Z directions to aid in understanding. Although a user may orient the described devices in various positions, various dimensions may be referred to as a width, a height, or a depth, which represent measurements on the X axis, Y axis, and Z axis, respectively. The term length is used universally and is not bound to measurements along in a single axial dimension.

Figure 1A:
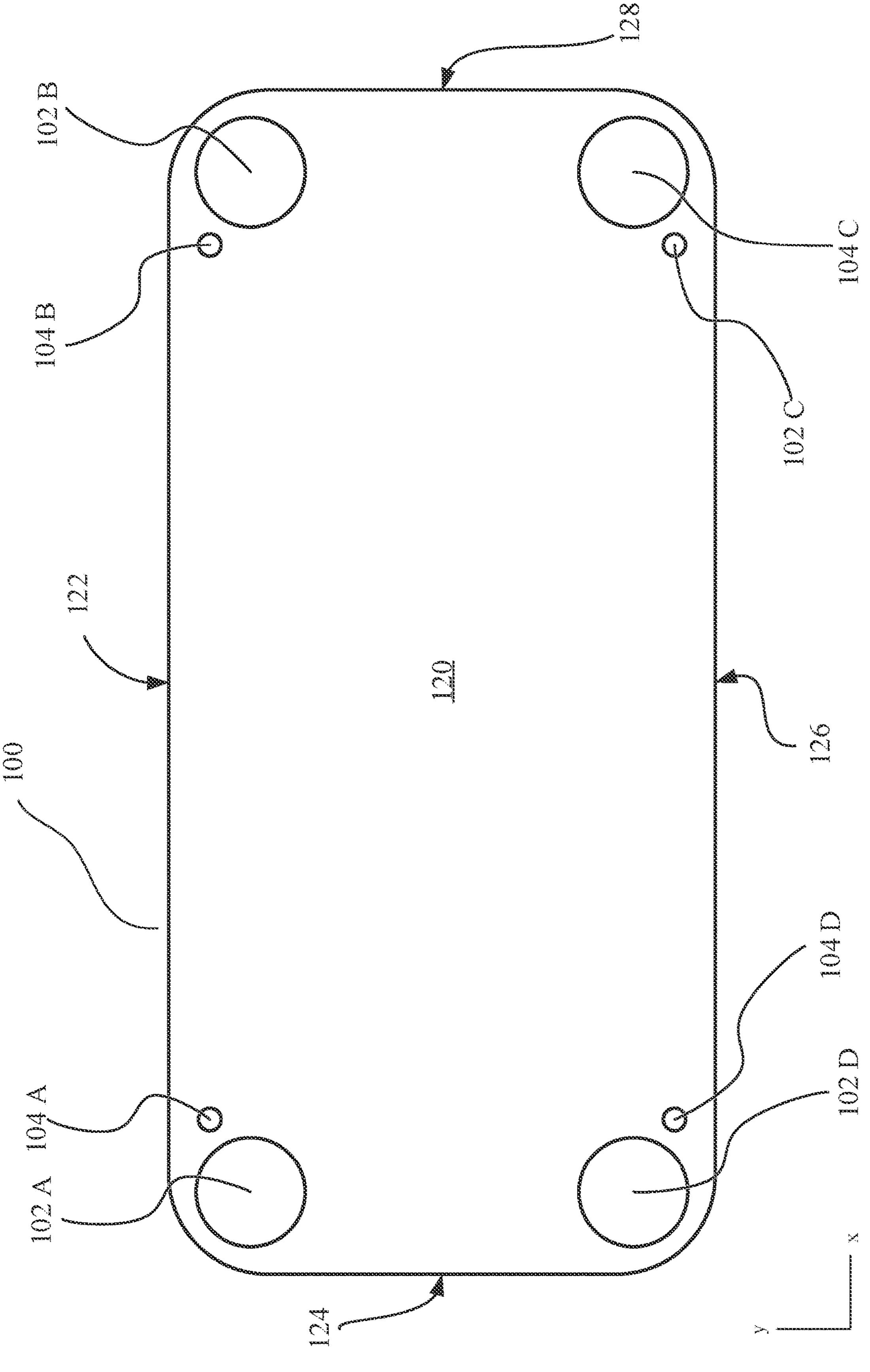
FIGS. 1A-C illustrate views of the outer clamping plate according to embodiments of the present disclosure.
Figure 1B:
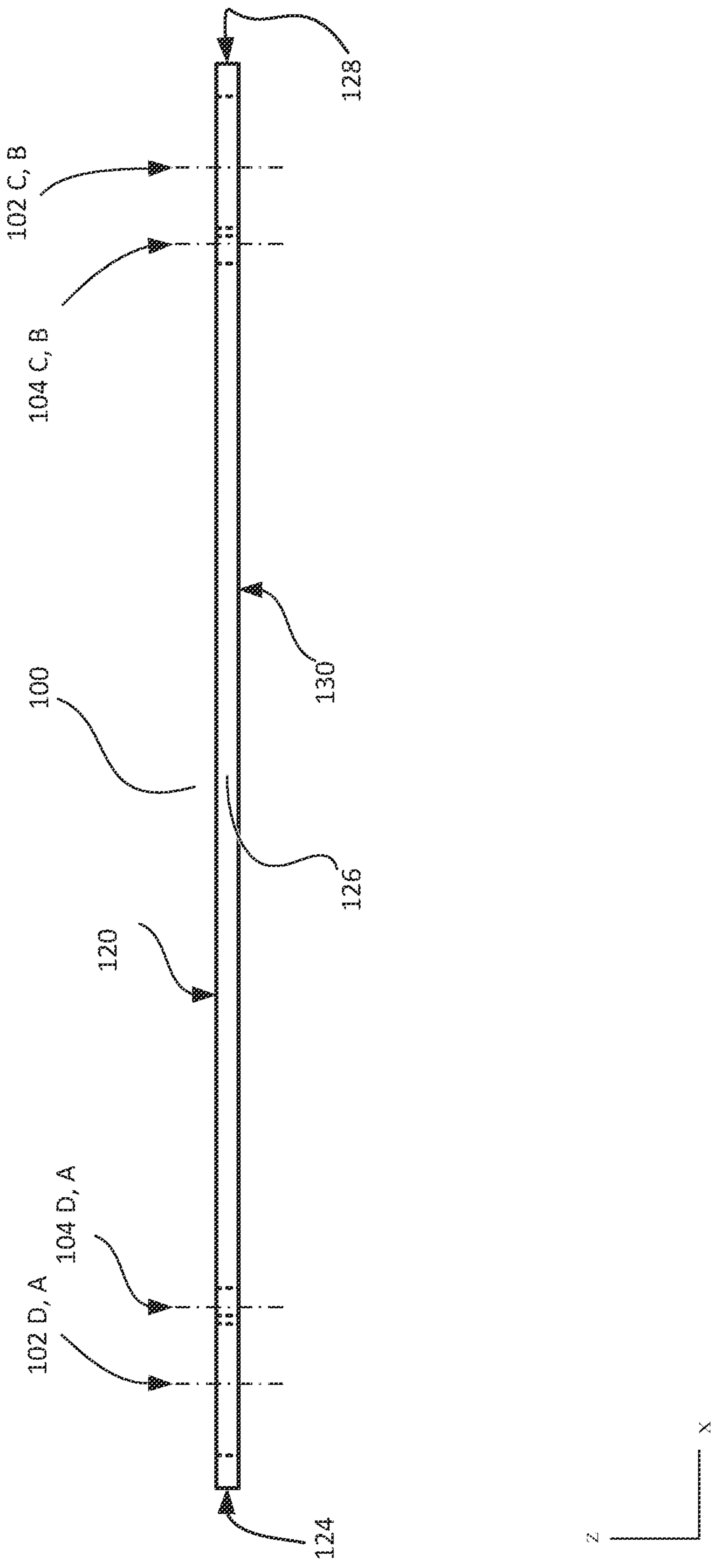
Figure 1C:
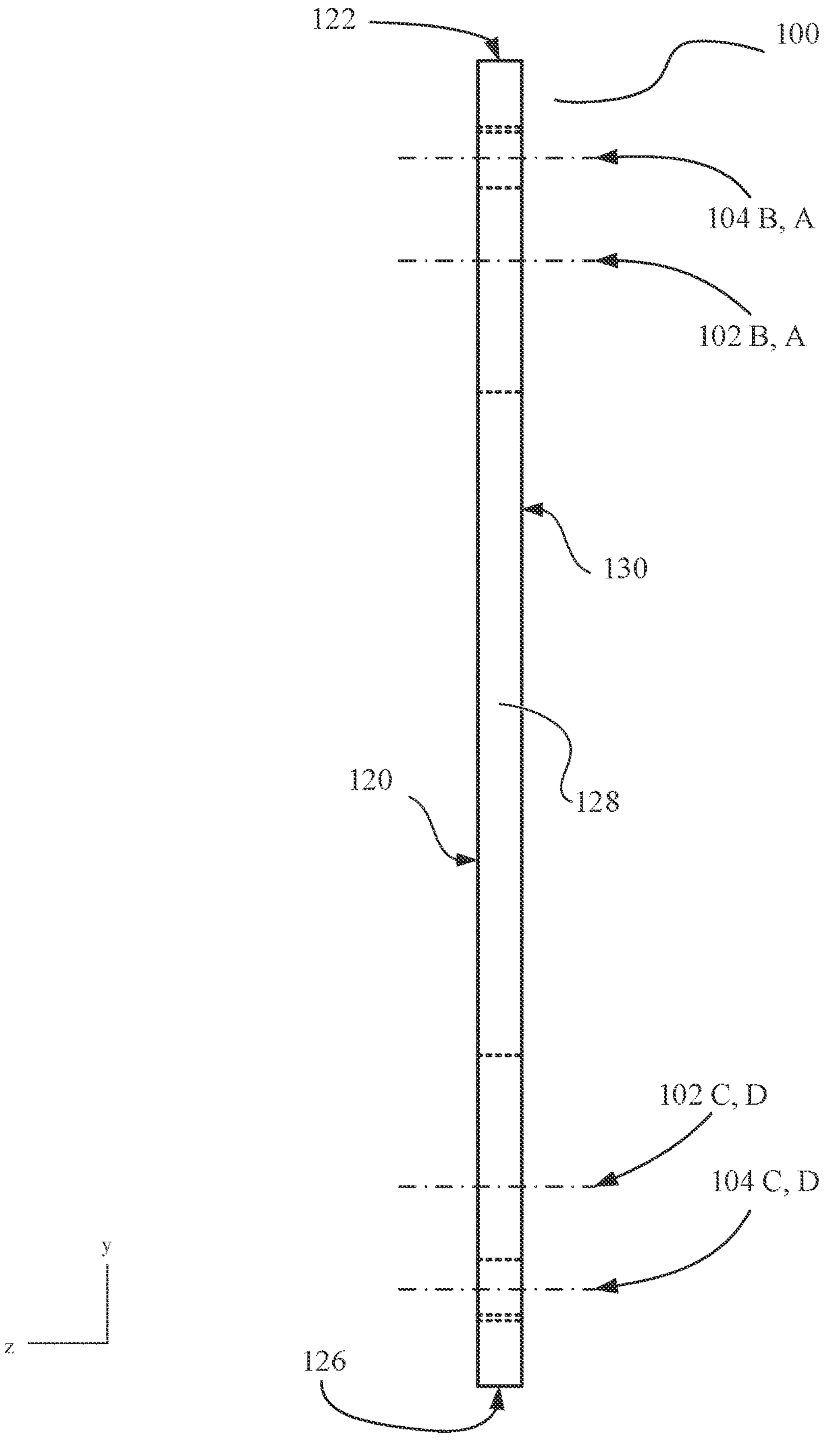

FIGS. 1A, 1B, and 1C illustrate a frontal view (in an X-Y plane), a bottom side view (in an X-Z plane), and a right side view (in a Z-Y plane), respectively, of the outer clamping plate 100. The terms "bottom side" and "right side" are used relative to the "frontal" view in FIG. 1A and are intended for ease of reference, not to define a permanent orientation. The outer clamping plate 100 is substantially rectangular, and has four tertiary screw holes 102 A-D (collectively tertiary screw holes 102) to accommodate screw overhang (see e.g., FIG. 6) from the indicia plate (see e.g., FIGS. 3A-C) and four secondary rivet holes 104 A-D (collectively secondary rivet holes 104) to accommodate the rivets (see e.g. FIG. 6), which provide the clamping action about the flexible material between the outer clamping plate and the inner clamping plate (see e.g. FIGS. 2A-C). The tertiary screw holes 102 and secondary rivet holes 104 are defined through the clamping surface 120 and the back surface 130. The primary clamping surface 120 and rear surface 130 are symmetrical, and bounded by side surfaces 122 and 126 in an X-Z plane and side surfaces 124 and 128 in a Y-Z plane.

Figure 2A:
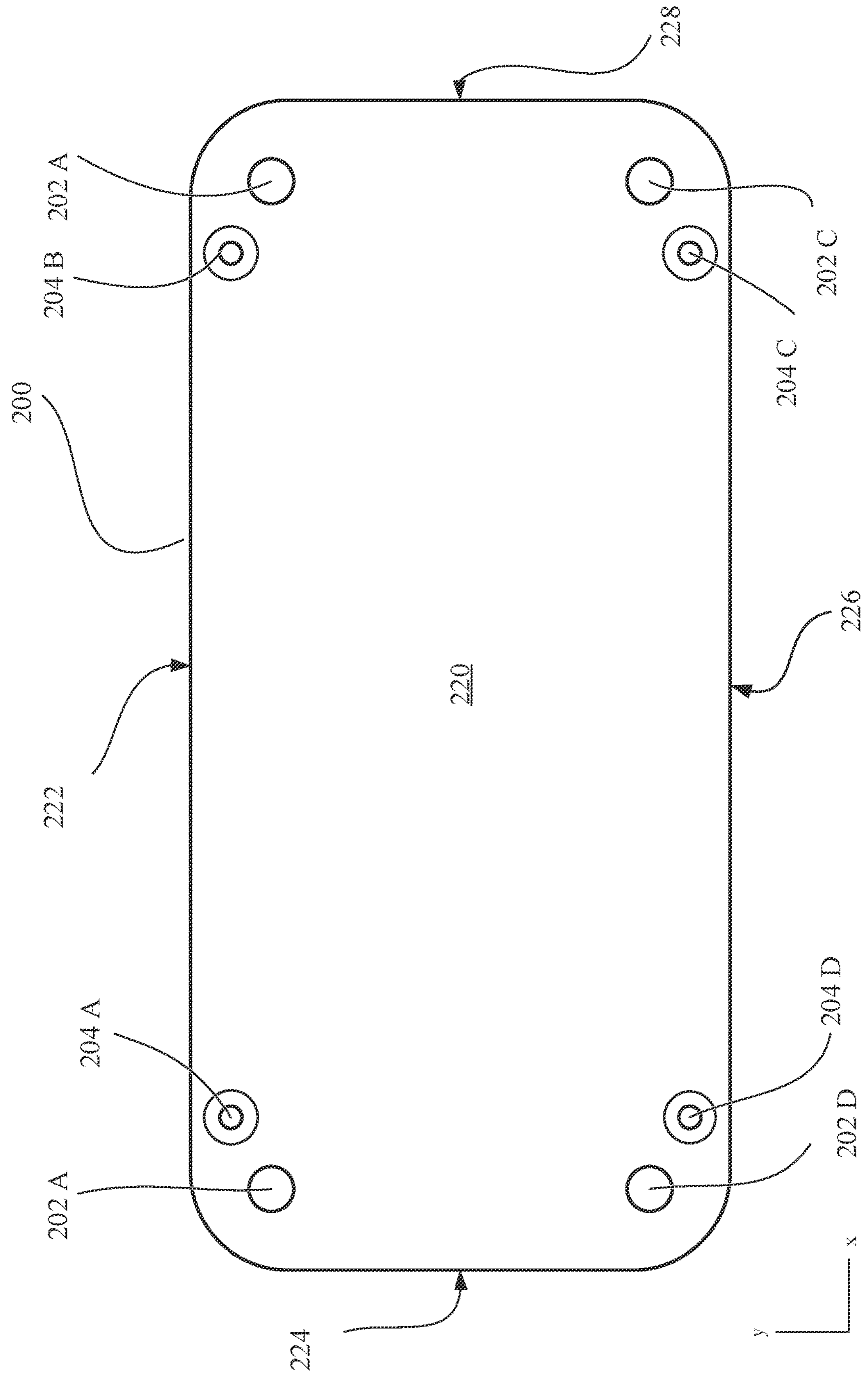
FIGS. 2A-C illustrate views of the inner clamping plate according to embodiments of the present disclosure.
Figure 2B:
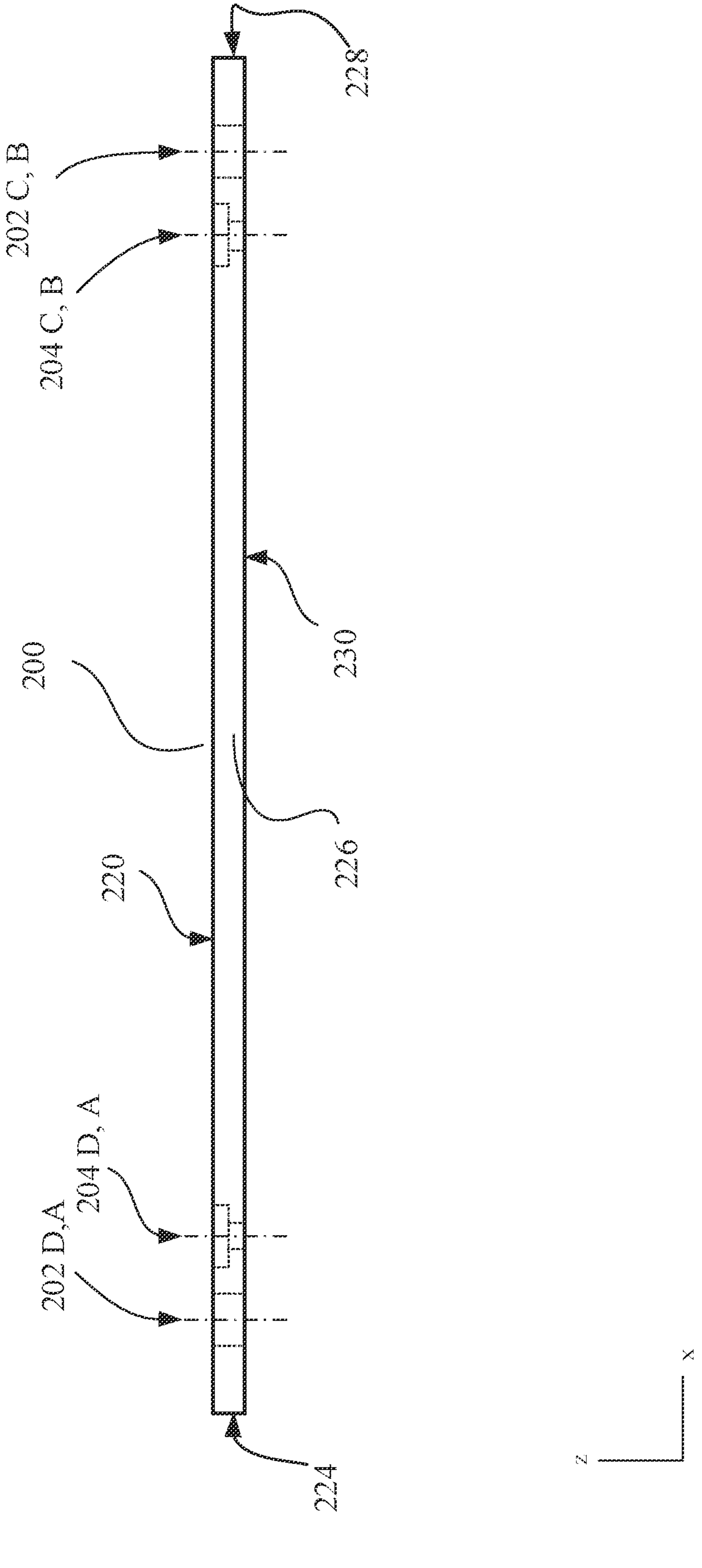
Figure 2C:
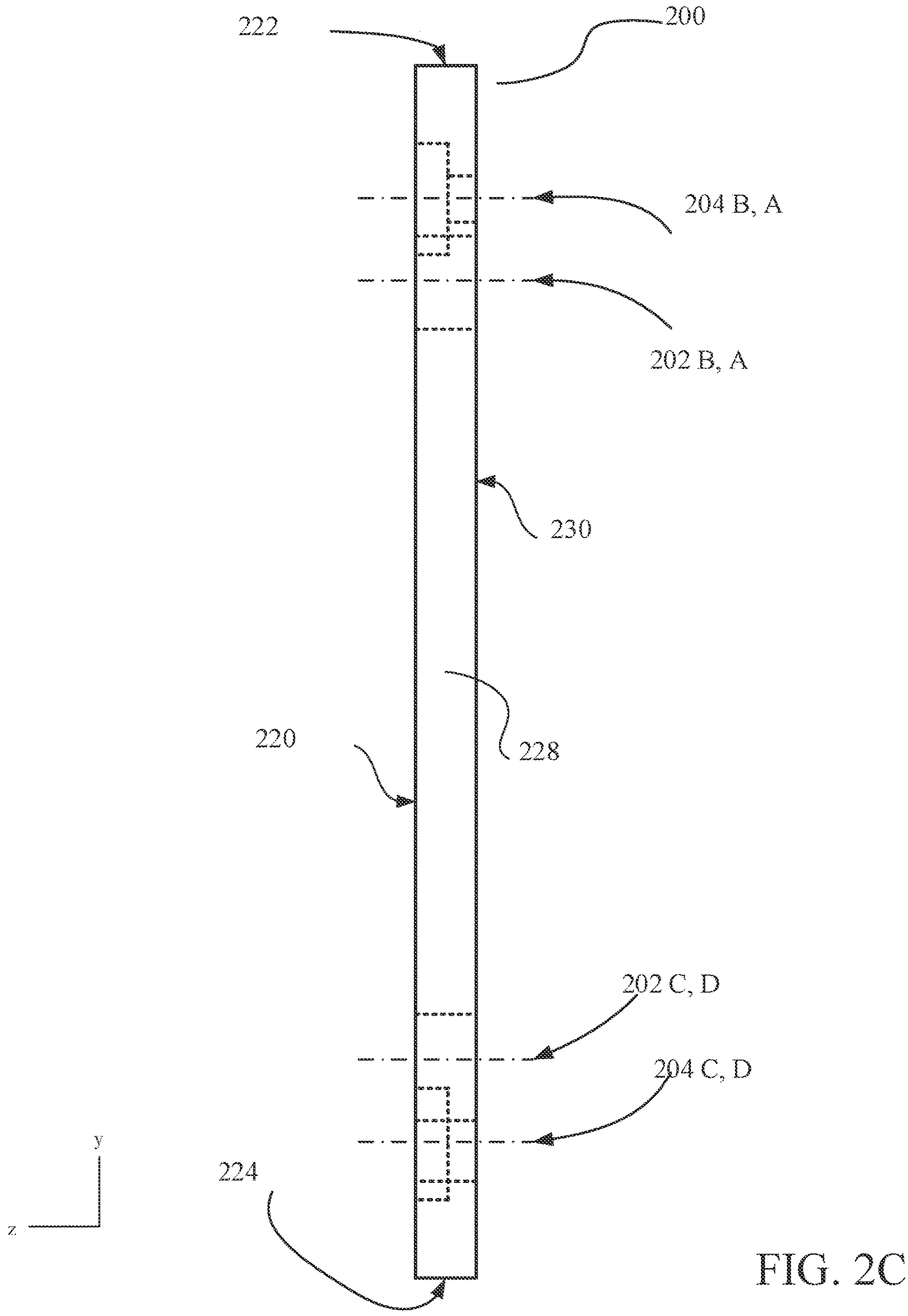

FIGS. 2A, 2B, and 2C illustrate a frontal view (in an X-Y plane), a bottom side view (in an X-Z plane), and a right side view (in a Z-Y plane), respectively, of the inner clamping plate 200. The terms "bottom side" and "right side" are used relative to the "frontal" view in FIG. 2A and intended for ease of reference, not to define a permanent orientation. The inner clamping plate has four counterbored primary rivet holes 204A-D (collectively primary rivet holes 204) in which the rivets (see e.g. FIG. 6) are disposed and four secondary screw holes 202A-D, which are threaded to receive screws (see e.g. FIG. 6). The primary rivet holes 204 and secondary screw holes 202 are defined through the contact surface 220 and the clamping surface 230. The primary contact surface 220 and secondary clamping surface 230 are bounded by two side surfaces 222, 226 in the X-Z plane and two side surfaces 224, 228 in a Y-Z plane. The inner clamping plate 200 has a sufficient thickness to accommodate the depth of the counterbored and unthreaded primary rivet holes 204 in which the heads of the rivets (see e.g. FIG. 6) are disposed.

Figure 3A:
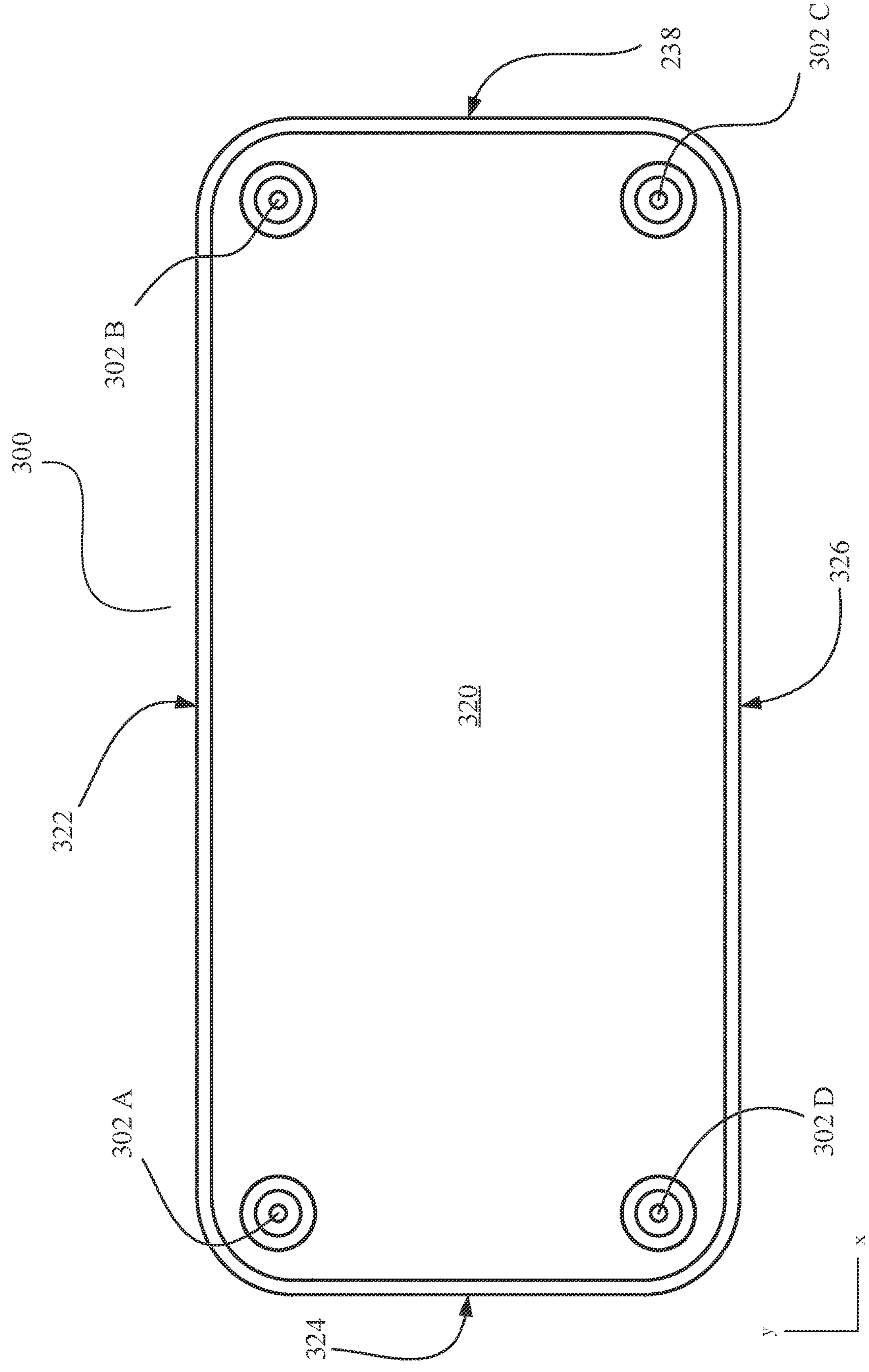
FIGS. 3A-C illustrate views of the indicia plate according to embodiments of the present disclosure.
Figure 3B:
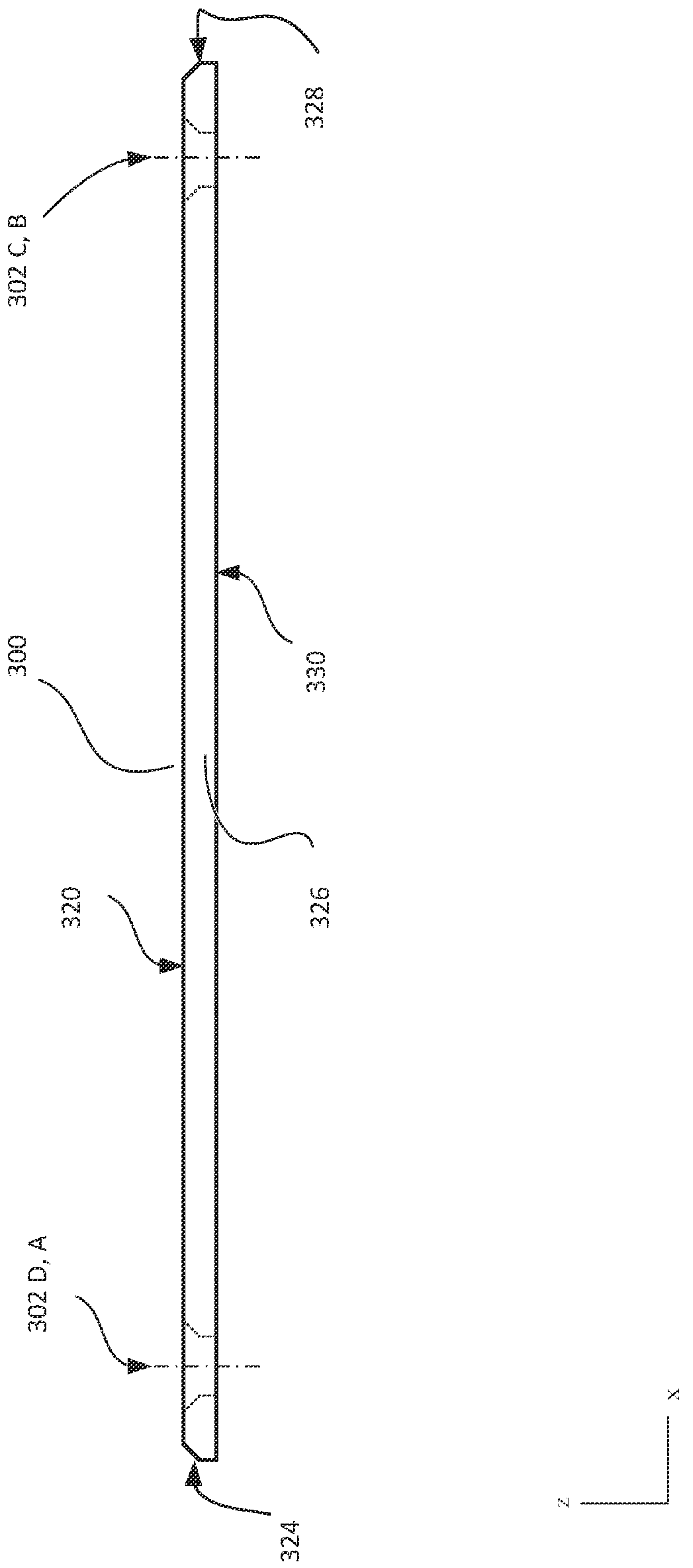
Figure 3C:
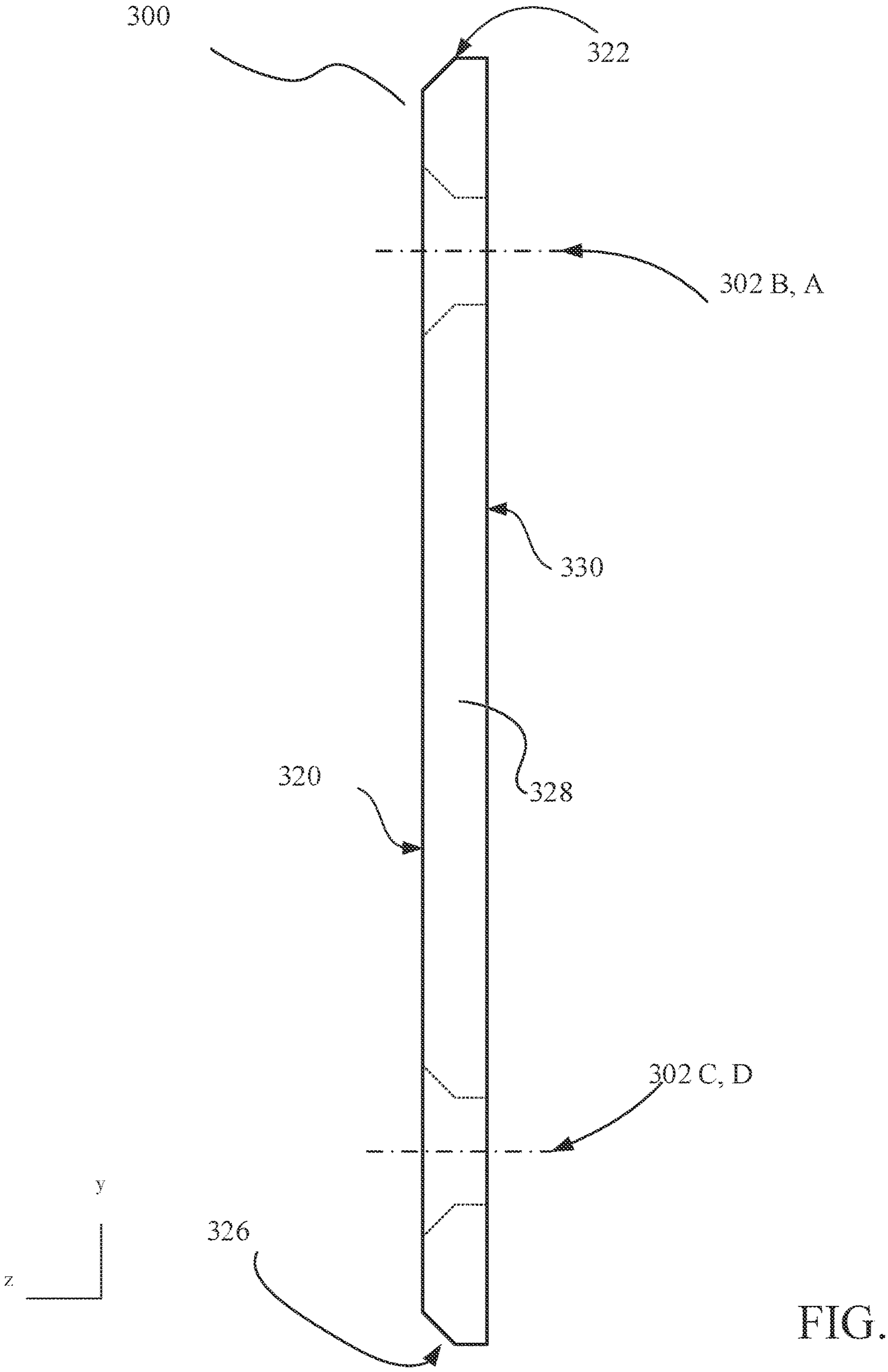

FIGS. 3A, 3B, and 3C illustrate a frontal view (in an X-Y plane), a bottom side view (in an X-Z plane), and a right side view (in a Z-Y plane), respectively, of the indicia plate 300. The terms "bottom side" and "right side" are used relative to the "frontal" view in FIG. 3A and intended for ease of reference, not to define a permanent orientation. The indicia plate 300 has four countersunk and threaded primary screw holes 302A-D (collectively primary screw holes 302) to accommodate the screws (see e.g. FIG. 6) that secure the indicia plate 300 to the inner clamping plate 200. The primary screw holes are defined by the display surface 320 and by the secondary contact surface 330.

Figure 4A:
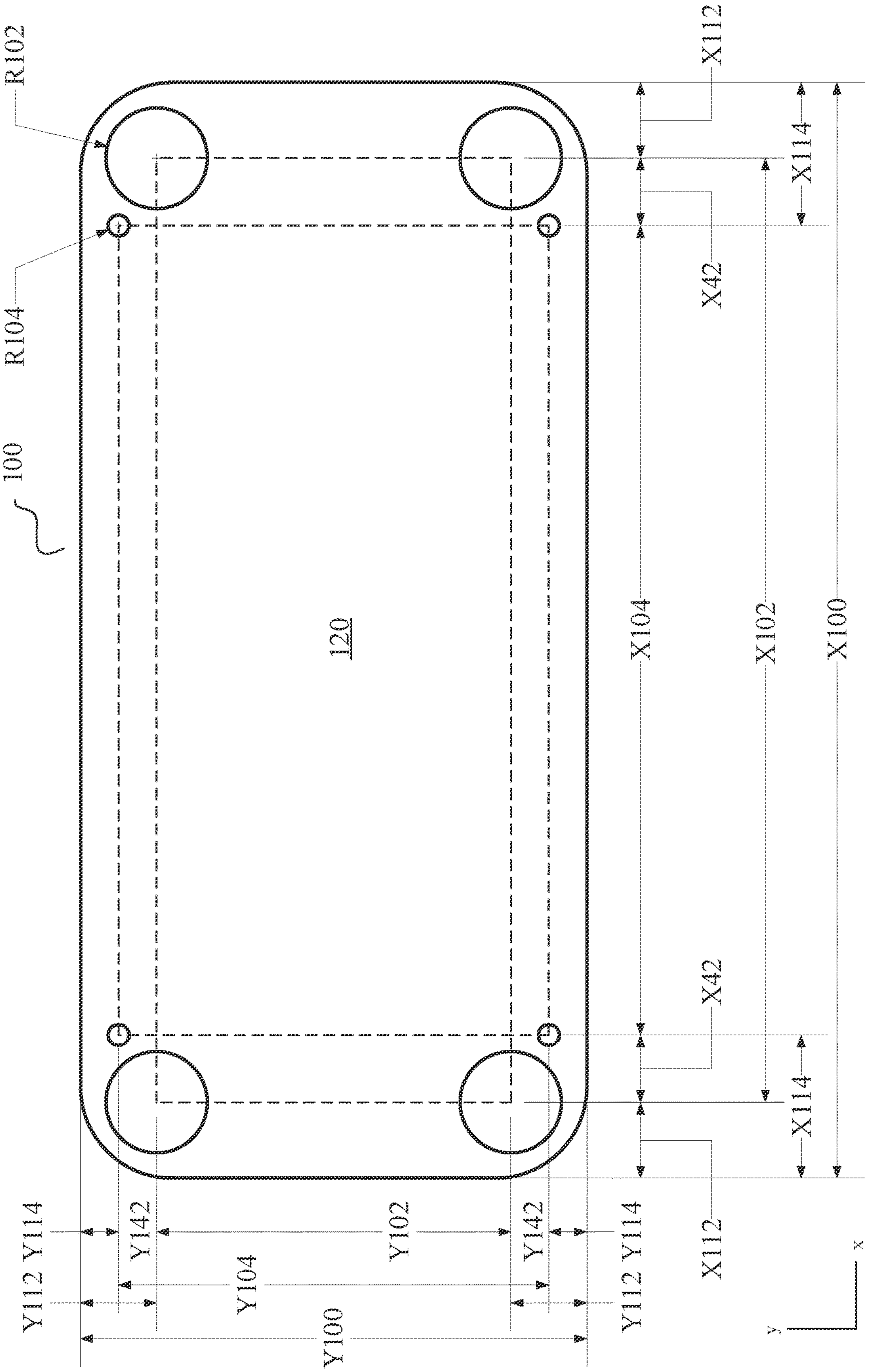
FIGS. 4A-C illustrate frontal views of the outer clamping plate, inner clamping plate and indicia plate, in which some relevant dimensions are shown.
Figure 4B:
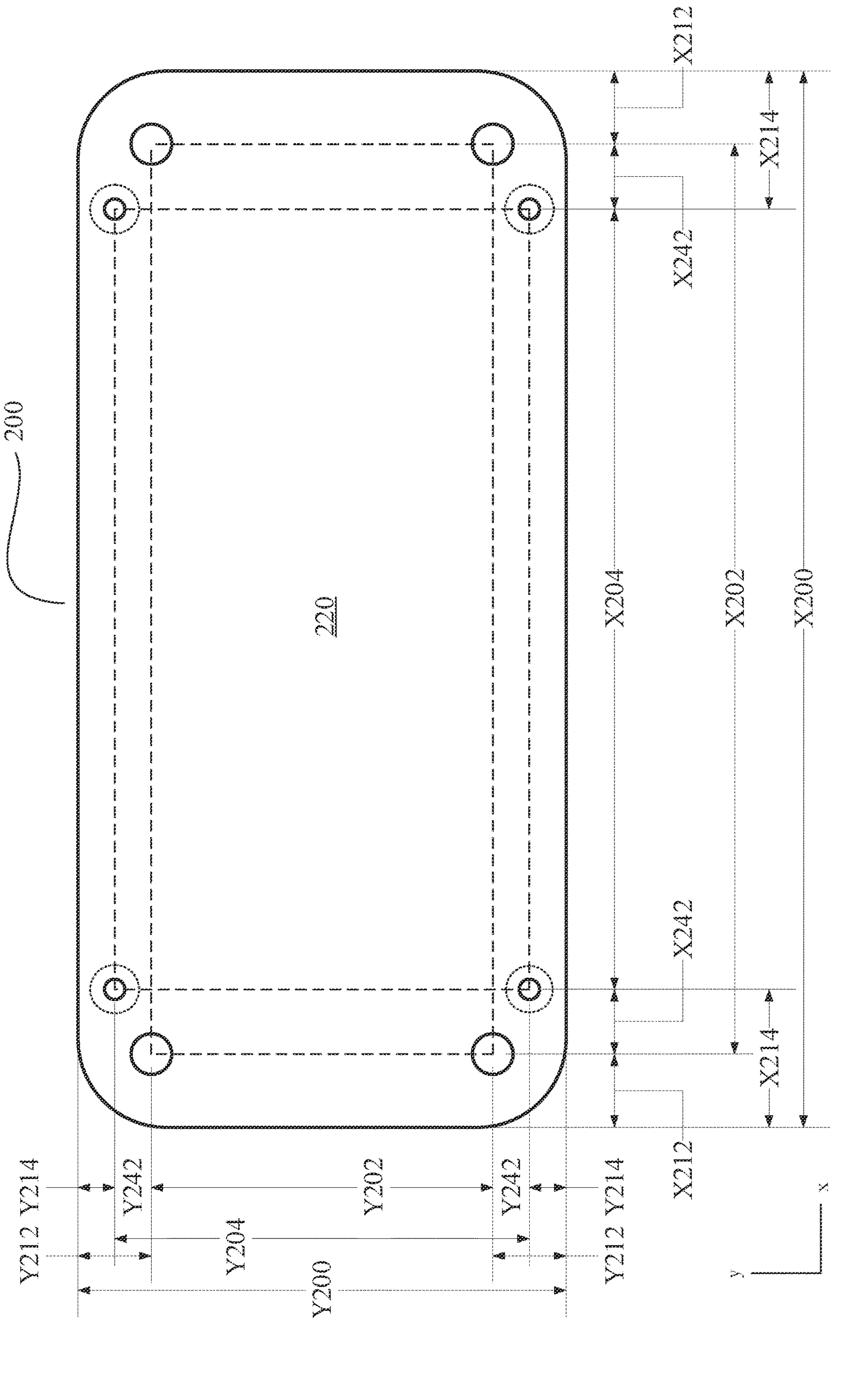
Figure 4C:
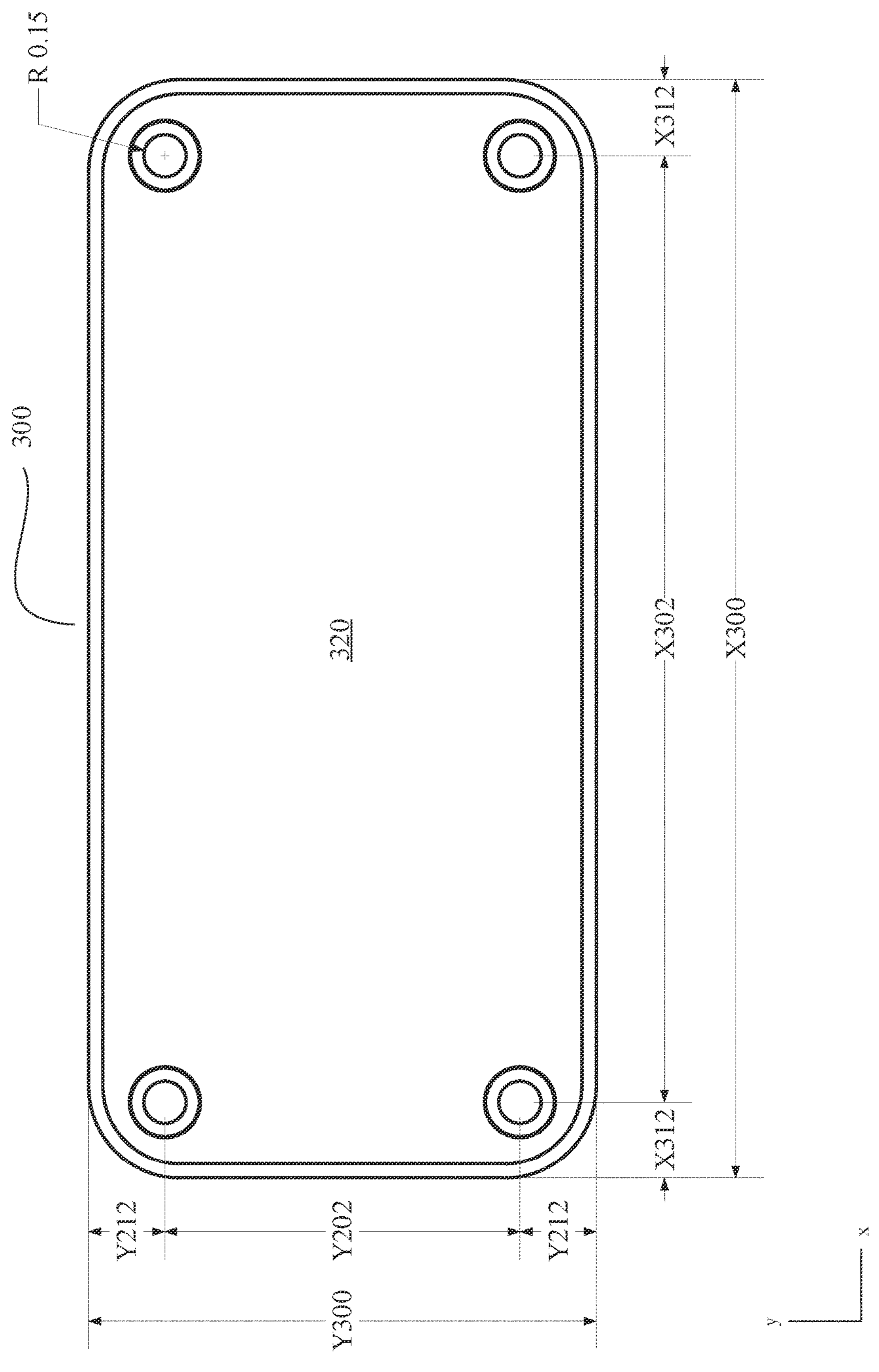

FIGS. 4A, 4B and 4C illustrate frontal views of the outer clamping plate 100, the inner clamping plate 200, and the indicia plate 300, respectively, in which some relevant dimensions are shown. It should be noted that the given dimensions and distances pertaining to any of the screw holes 102, 202, 302 or rivet holes 104, 204 are given relative to the center points thereof.

FIG. 4A shows the outer clamping plate 100, according to embodiments of the present disclosure. The outer clamping plate 100 has a width X100 corresponding to the side lengths of the X-Z surfaces 122, 126 and a height Y100 corresponding to the side lengths of the Y-Z surfaces 124, 128. The tertiary screw holes 102 are defined at each corner of the outer clamping plate 100 and have a radius R102, wherein each screw hole 102 has a horizontal distance X112 from the nearest Y-Z surface 124, 128, and a vertical distance Y112 from the nearest X-Z surface, 122, 126. The tertiary screw holes are separated by a horizontal distance X102 and a vertical distance Y102. The secondary rivet holes 104 are also defined at the corners of the outer clamping plate 100, having a radius R104, and can be regarded to each have a respective proximate tertiary screw hole 102. The secondary rivet holes 104 each have a horizontal distance X114 from the nearest Y-Z surface 124, 128, and a vertical distance Y114 from the nearest X-Z surface, 122, 126. The secondary rivet holes 104 are separated by a horizontal distance X104 and a vertical distance Y104. There is a horizontal distance X142 between the center points of each tertiary screw hole 102 and the respective secondary rivet hole 104, and a vertical distance Y142 between the center points of the same.

FIG. 4B shows the inner clamping plate 200, according to embodiments of the present disclosure. The inner clamping plate 200 has a width X200 corresponding to the side lengths of the X-Z surfaces 222, 226 and a height Y200 corresponding to the side lengths of the Y-Z surfaces 224, 228. The secondary screw holes 202 are defined at each corner of the inner clamping plate 200 and have a radius R202, wherein each secondary screw hole 202 has a horizontal distance X212 from the nearest Y-Z surface 224, 228, and a vertical distance Y212 from the nearest X-Z surface, 222, 226. The secondary screw holes 202 are separated by a horizontal distance X202 and a vertical distance Y202. The primary rivet holes 204 are also defined at the corners of the inner clamping plate 200, having a radius R204, and can be regarded to each have a respective proximate secondary screw hole 202. The primary rivet holes 204 each have a horizontal distance X214 from the nearest Y-Z surface 224, 228, and a vertical distance Y214 from the nearest X-Z surface, 222, 226. The primary rivet holes 204 are separated by a horizontal distance X204 and a vertical distance Y204. There is a horizontal distance X242 between the center points of each secondary screw hole 202 and the respective primary rivet hole 204, and a vertical distance Y242 between the center points of the same.

FIG. 4C shows the indicia plate 300, according to embodiments of the present disclosure. The indicia plate 300 has a width X300 corresponding to the side lengths of the X-Z surfaces 322, 326, and a height Y300 corresponding to the side lengths of the Y-Z surfaces, 224, 228. The primary screw holes 302 are defined at each corner of the plate 300 and have a radius of R302, wherein each primary screw hole 302 is a horizontal distance X312 from the nearest Y-Z surface 324, 328, and a vertical distance Y312 from the nearest X-Z surface 322, 326. The primary screw holes 302 are separated by a horizontal distance X302 and a vertical distance Y302.

Figures 5A, 5B, 5C:
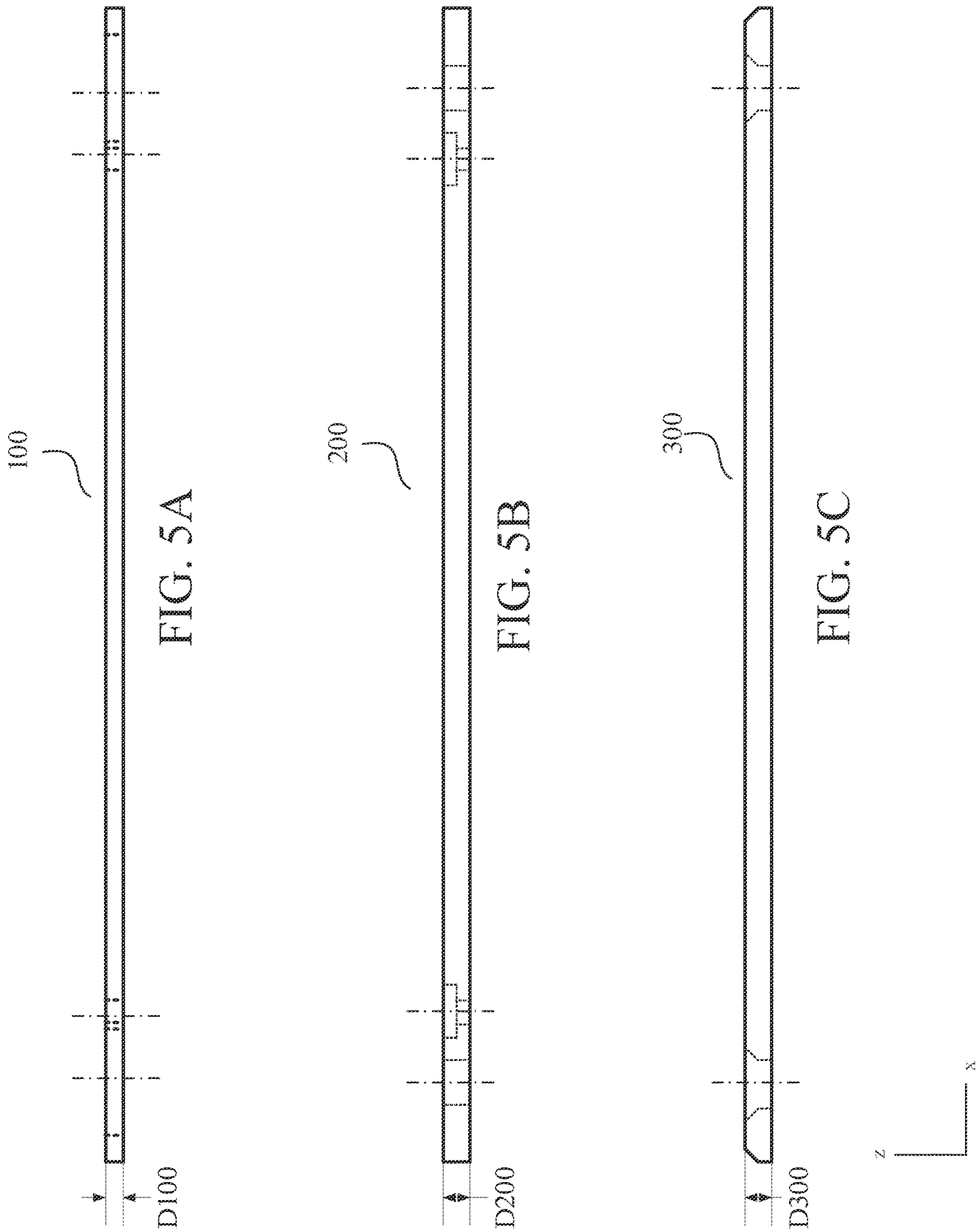
FIGS. 5A-C illustrate side views of the outer clamping plate, inner clamping plate and indicia plate, in which some relevant dimensions are shown.

FIGS. 5A, 5B, and 5C illustrate bottom side views of the outer clamping plate 100, the inner clamping plate 200, and the indicia plate 300, respectively, in which some relevant dimensions are shown.

FIG. 5A shows the outer clamping plate 100, according to embodiments of the present disclosure. The outer clamping plate 100 has a first depth D100.

FIG. 5B shows the inner clamping plate 200, according to embodiments of the present disclosure. The inner clamping plate 200 has a second depth D200.

FIG. 5C shows the indicia plate 300, according to embodiments of the present disclosure. The indicia plate 300 has a third depth D300.

According to some embodiments, certain measurements may be matched between the various plates for the purposes of alignment and symmetry.

According to some embodiments, as the screw holes 102, 202, 302 are aligned and the rivet holes 104, 204 are also aligned, the center point distances between screw holes and rivet holes on each plate are the same, wherein X142=X242, Y142=Y242, X102=X202=X302, Y102=Y202=Y302, X104=X204, and Y104=Y204.

According to some embodiments, the distances from center points of screw holes 102, 202, 302 and rivet holes 104, 204 to the nearest side thereof may be the same, wherein X112=X212=X312, Y112=Y212=Y312, X114=X214, and Y114=Y214.

According to some embodiments, the widths and heights of each plate are the same, wherein X100=X200=X300 and Y100=Y200=Y300.

According to some embodiments, the depths of the clamping plates, D100, D200 are configured to be as thin as possible while maintaining rigidity and structural integrity, so as to reduce the amount of mass the plate assembly adds to the purse, bag or other accessory, the amount of volume occupied in a storage area thereof, and the amount of space projecting therefrom.

According to some embodiments, the aspect ratio of the depth D100 to the width X100 of the outer clamping plate 100 may be in the range of 1:50 to 1:150.

According to some embodiments, the aspect ratio of the depth D200 to the width X200 of the inner clamping plate 200 may be in the range of 1:20 to 1:100.

According to some embodiments, the aspect ratio of the depth D300 to the width X300 of the indicia plate 300 may be in the range of 1:20 to 1:100.

According to some embodiments, the aspect ratio of the vertical distance Y114 between the center points of the secondary rivet holes 104 and the nearest X-Z surface 122, 126 and the horizontal distance X104 between the center points of the secondary rivet holes 104 may be in the range of 1:20 to 1:50.

According to some embodiments, the aspect ratio of the horizontal distance X114 between the center points of the secondary rivet holes and the nearest Y-Z surface 124, 128 and the horizontal distance X104 between the center points of the secondary rivet holes 104 may be in the range of 1:4 to 1:15.

According to some embodiments, the aspect ratio of the vertical distance Y114 between the center points of the secondary rivet holes 104 and the nearest X-Z surface 122, 126 and the depth of the plate D100 may be in the range of 1:2 to 1:10.

According to some embodiments, the aspect ratio of the vertical distance Y212 between the center points of the secondary screw holes 202 and the nearest X-Z surface 222, 226 and the depth of the plate D200 may be in the range of 1:2 to 1:15.

According to some embodiments the aspect ratio of the vertical distance Y214 between the center points of the primary rivet holes 204 and the nearest X-Z surface 222, 226 and the vertical distance Y212 between the center points of the secondary screw holes 202 and the nearest X-Z surface 222, 226 may be in the range of 1:1 to 1:10.

According to some embodiments, the aspect ratio of the depth of the outer clamping plate D100 to the depth of the inner clamping plate D200 may be in the range of 1:1 to 1:4.

Figure 6A:
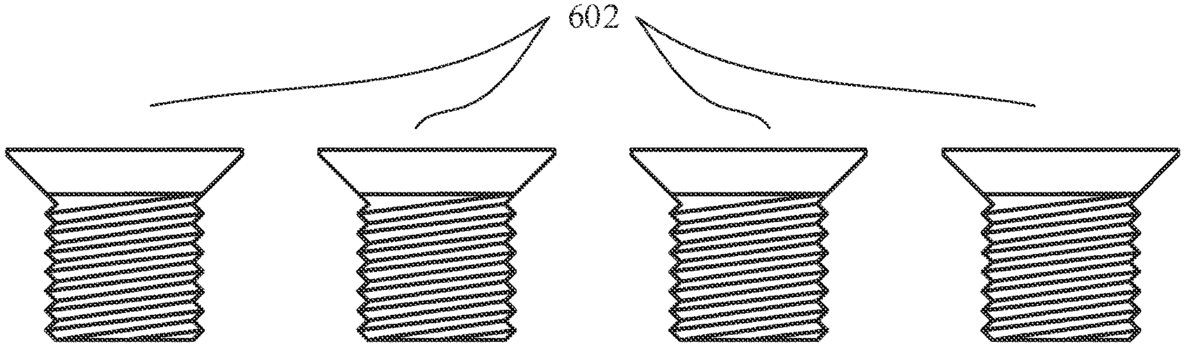
FIGS. 6A-B illustrates the fasteners according to embodiments of the present disclosure.

FIG. 6A illustrates examples of screws 602 used to secure the indicia plate 300 to the inner clamping plate 200.

Figure 6B:
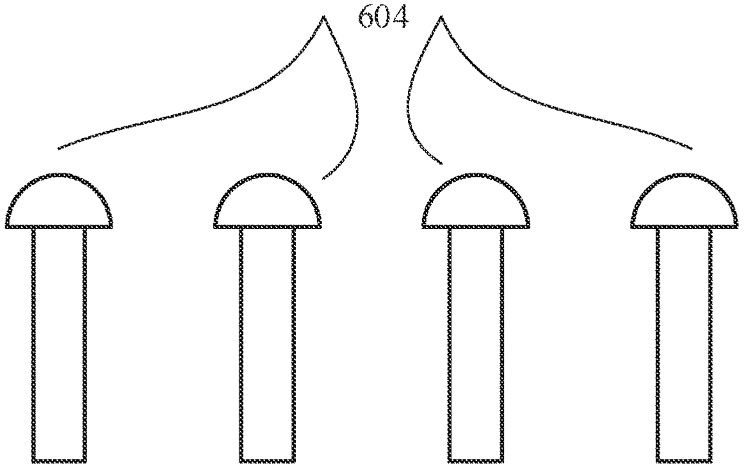

FIG. 6B illustrates examples of rivets 604 used to secure the inner clamping plate 200 to the outer clamping plate 100.

Although shown in FIGS. 6A-B as screws 602 and rivets 604, the present disclosure further contemplates that other types of fasteners may be used and in different numbers based on the size, rigidity, and aesthetic demands for the assembly. For example, in some embodiments, other fastening mechanisms (e.g., rivets or plastic fasteners) may be used; in some such embodiments, removal of the indicia plate may require breaking or destroying the fastening mechanisms, and re-affixing the indicia plate may require the use of new, unbroken, fastening mechanisms. In some embodiments, glue is provided on the rivets and/or screws to further reduce the case of accidental removal of any of the plates disclosed in the embodiments herein.

As discussed above, in some embodiments the apparatus disclosed herein may be used on rigid or semi-rigid goods, such as hard shell suitcases or pieces of luggage. In these embodiments, the same structure described herein may be used. In some such embodiments, the rigid material onto which the inner and outer clamping plates clamp may be threaded with holes corresponding to the screw holes, such that the screws thread into not only the clamping plates themselves but into the rigid material clamped between the clamping plates.

Figure 7:
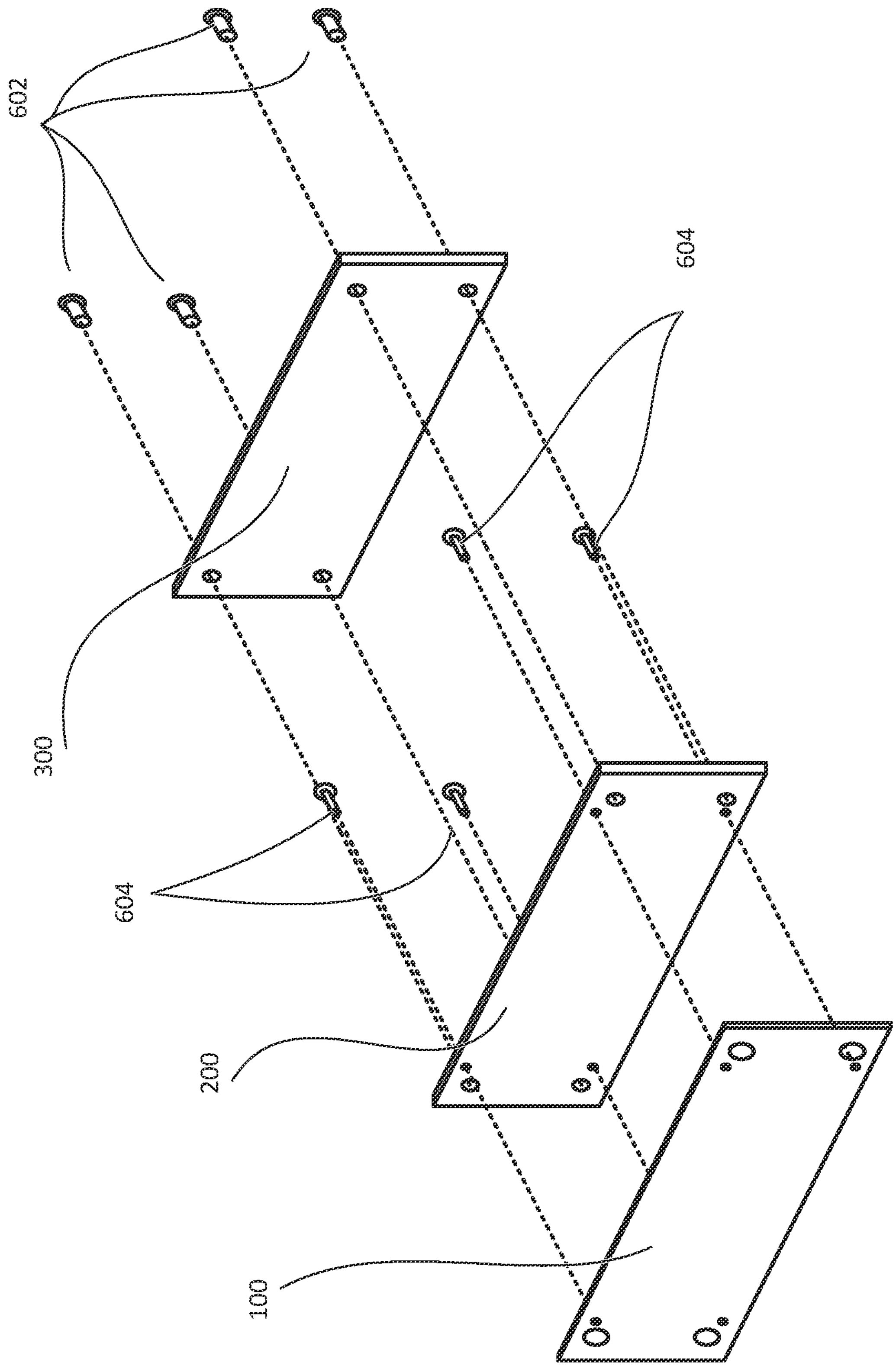
FIG. 7 illustrates a schematic of the plate assembly according to embodiments of the present disclosure.

FIG. 7 illustrates a schematic for the entire plate assembly according to embodiments of the present disclosure. The rivets 604 are disposed within the counterbored primary rivet holes 204 of the inner clamping plate 200 and extend through and perforate a flexible material (see e.g. FIG. 8). The rivets 604 are secured within the secondary rivet holes 104 where the rivets 604 are permanently fastened during assembly. The screws 402 are disposed within the countersunk primary screw holes 302 in the indicia plate 300, and provide a secure attachment to the inner clamping plate 200 via the secondary screw holes 202. In various embodiments, overhang from the screws 602 (e.g., when the length of the screw 602 projects further than the secondary clamping surface 230) is accommodated by the presence of the corresponding tertiary screw hole 102.

In various embodiments, the lengths of the screws 602 are intentionally over-dimensioned (e.g., greater than the combined depths of depth D200 and depth D300) so as to provide an additional contact point with the flexible material secured between the outer clamping plate 100 and inner clamping plate 200, but may be less than the total depth of the plate assembly (e.g., screw length<depth D100+depth D200+depth D300) to avoid damage or tearing of the flexible material.

Figure 8:
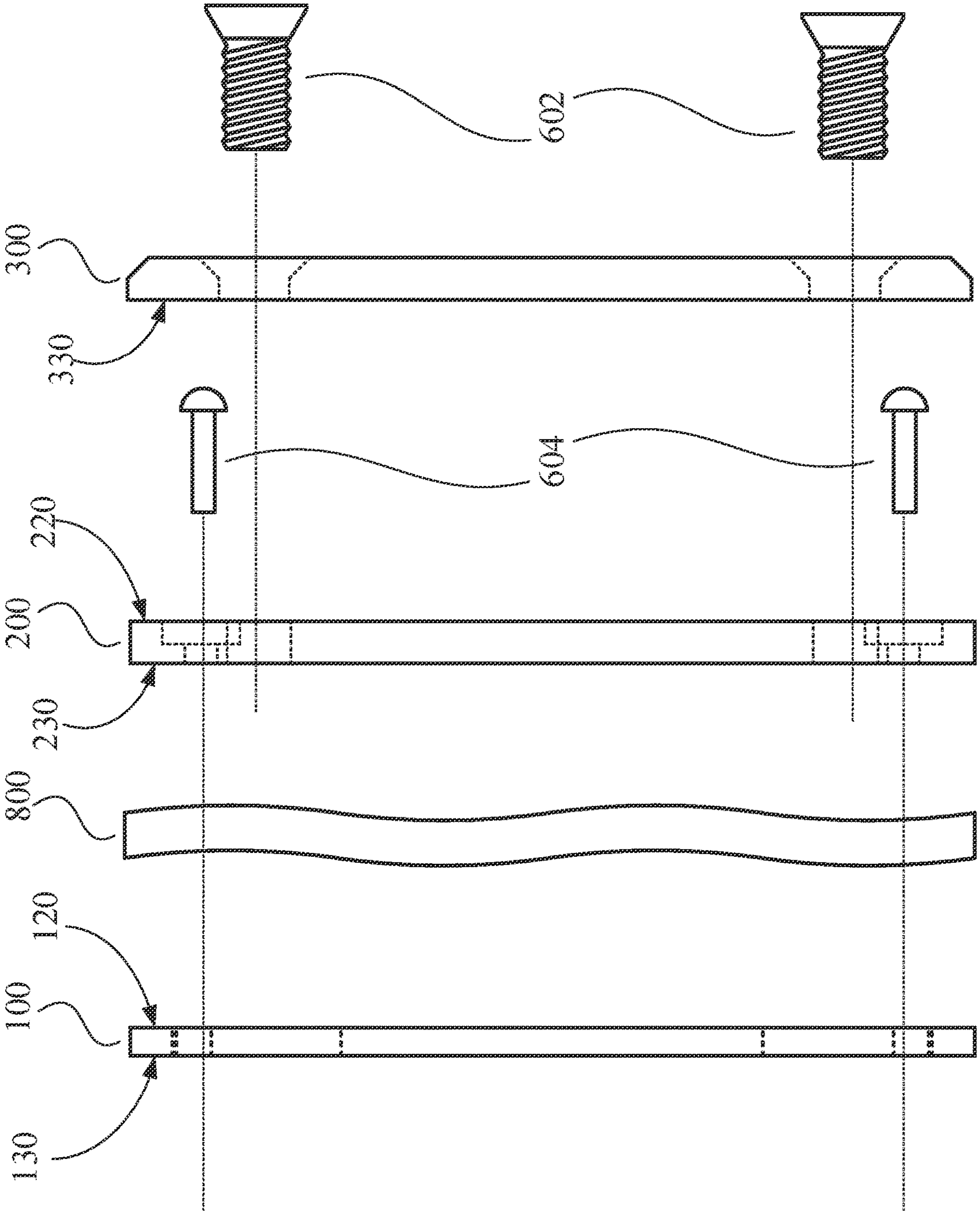
FIG. 8 illustrates a schematic of the plate assembly when installed on a flexible material according to embodiments of the present disclosure.

FIG. 8 shows a cross section of an example plate assembly, according to embodiments of the present disclosure. Flexible material 800 is flanked on opposite sides by the inner clamping plate 200 and the outer clamping plate 100, and the rivets 604 secure the outer clamping plate 100 and inner clamping plate 200 together with the flexible material 800 held securely in between. The screws 602 secure the indicia plate 300 to the inner clamping plate 200.

The device is assembled by first aligning the outer clamping plate 100 with the inner clamping plate 200 on either side of a flexible material 800. The clamping surface 120 of the outer clamping plate 100 and the clamping surface 230 of the inner clamping plate 200 contact the flexible material 800. When the outer clamping plate 100 and inner clamping plate 200 are aligned, the secondary rivet holes 104 of the outer clamping plate 100 and the primary rivet holes 204 of the inner clamping plate 200 are also aligned. The rivets 604 are installed through the primary rivet holes 204, perforating the flexible material 800, thereby securing the secondary rivet holes 104, such that a clamping force is imposed on the flexible material 800 via the rivets 604 and the inner clamping plate 200 and outer clamping plate 100.

The indicia plate 300 is installed by aligning the indicia plate 300 with the inner clamping plate 200 such that the primary screw holes 302 on the indicia plate 300 are also aligned with the secondary screw holes 202 on the inner clamping plate 200, and the contact surface 220 of the inner clamping plate 200 contacts the contact surface 330 of the indicia plate 300. The screws 602 are installed in the primary screw holes 302 and rigidly secure the indicia plate 300 to the inner clamping plate 200 via the secondary screw holes 202.

The indicia plate 300 may be interchanged with other indicia plates 300, which are structurally compatible with the other components of the device, but bear unique indicia, or are made of different materials, and selected by a user for aesthetic purposes.

The indicia plates 300 may be readily interchanged by removing the screws 602, removing the first indicia plate 300, aligning another indicia plate 300, and reinstalling the screws 602.

The media appearing on the indicia plate(s) 300 may be etched, embossed, printed, inlaid, or otherwise inscribed on the display surface 320 of indicia plate 300.

Alternate indicia plates 300 may be configured as name tags, logo plates, decorative plates, or plates having various other identifiers, markings, images or symbols.

Although the primary screw holes 302 are herein described as countersunk, this disclosure further contemplates embodiments having other types of holes, including but not limited to counterbored holes, spotface holes, and counterdrilled holes.

Although the primary rivet holes 204 a herein described as counterbored, this disclosure further contemplates embodiments having other types of holes, including but not limited to countersunk holes, spotface holes, and counterdrilled holes.

Although the outer clamping plate 100, inner clamping plate 200 and indicia plate(s) 300 are herein illustrated and described as substantially rectangular, this disclosure further contemplates embodiments wherein the plates have other shapes, including but not limited to circular, ovular, square, and polygonal.

According to some embodiments, the outer clamping plate 100, inner clamping plate 200, and indicia plate(s) 300 may have squared, rounded, beveled, filleted, or chamfered edges and corners.

According to some embodiments, the primary rivet holes 204 are counterbored to the minimum depth possible to accommodate the heads of the rivets 604, such that the heads of the rivets do not interfere with the joining of the contact surfaces 220, 330 when the inner clamping plate 200 and indicia plate 300 are aligned and fastened together.

According to some embodiments, the primary screw holes 302 are countersunk, such that when the screws 602 are disposed within the primary screw holes 302, the heads of the screws form a smooth surface with the indicia plate 300.

According to some embodiments, fasteners other than screws and rivets may be used, including but not limited to, bolts, pins, nails, and other fasteners.

According to some embodiments, the outer clamping plate 100, inner clamping plate 200, and indicia plate(s) 300 may have a number of through holes greater or less than the four described herein, in order to accommodate a greater or lesser number of corresponding fasteners.

According to some embodiments, the outer clamping plate 100, inner clamping plate 200, and indicia plate(s) 300 may be constructed of any of or a combination of a group of materials, at least consisting of but not limited to, wood, plastics, polymers, carbon fiber, aluminum, brass, steel, bronze, bamboo, glass, ceramics, and rigid materials of the like.

According to some embodiments, each indicia plate 300 bears an indicia that is unique compared to the indicia of other indicia plates 300. In some embodiments, the indicia plate is customized or customizeable, such that a user may personalize his or her luggage, for example. In some embodiments, the indicia plate has an indicum on each side, and may be flipped over depending on the desires of the user. In one such embodiment, the screws may or may not be countersunk; if they are countersunk, they may be countersunk on one or both sides of the indicia plate.

According to some embodiments, the secondary rivet holes 104 are regarded as a first plurality of through holes, the primary rivet holes 204 are regarded as a second plurality of through holes, the secondary screw holes 202 are regarded as a third plurality of screw holes, the primary screw holes 302 are regarded as a fourth plurality of through holes, and the primary screw holes 302 of alternate indicia plates 300 are regarded as a fifth plurality of through holes.

According to some embodiments, the flexible material 800 is regarded as an intervening flexible material.

According to some embodiments, the primary rivet holes 204 and secondary rivet holes 104 are regarded as paired.

According to some embodiments a clamping action is produced by the rivets 604 between the inner clamping plate 200 and the outer clamping plate 100.

According to some embodiments, the primary screw holes 302, the secondary screw holes 202 and the tertiary screw holes 102 are regarded as paired.

According to some embodiments, the flexible material 800 may comprise any of or a combination of a group of materials, at least consisting of but not limited to, leather, leatherette, canvas, denim, cotton, tweed, burlap, velvet, felt, polyester, nylon, wool, bamboo fiber, silk, fur, neoprene, vinyl fabrics and the like.

According to some embodiments, the diameter of the primary rivet holes 204 and secondary rivet holes 104 is larger than the gauge of the rivets 604.

According to some embodiments, the device may take the form of a kit, including an outer clamping plate 100, an inner clamping plate 200, multiple indicia plates 300, multiple rivets 604, multiple screws 602, and in some embodiments, the kit includes an item of baggage at least partially made of a flexible material.

In some embodiments, the indicia plates are sized and shaped to be removably mounted to different articles (e.g., different bags) that have the same sized clamping plate assemblies on each. In these embodiments, a user may purchase a single indicia plate and may move that plate to different articles (e.g., different bags) depending on which articles he or she is carrying on a given day. In some embodiments, multiple articles and an indicia plate are sold together as a kit, permitting customization of each of the articles as desired.

The term "item of baggage" as used in the present disclosure, is understood to include purses, handbags, backpacks, shoulder packs, fanny packs, belt bags, soft sided cases, duffel bags, suitcases, wallets, coin purses, briefcases, satchels, computer bags, pannier bags, bicycle bags, rucksacks, saddlebags, and other soft goods.

Certain terms are used throughout the description and the claims to refer to particular features or components. As one skilled in the art will appreciate, different persons may refer to the same feature or component by different names. This document does not intend to distinguish between components or features that differ in name but not function.

As used herein, "about," "approximately" and "substantially" are understood to refer to numbers in a range of the referenced number, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole numbers, or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof. For avoidance of doubt, the phrase "at least one of A, B, and C" shall not be interpreted to mean "at least one of A, at least one of B, and at least one of C".

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112(f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

The invention is claimed as follows:

1. A device comprising:

a first plate, defining a first plurality of through holes;

a second plate, defining a second plurality of through holes matched with the first plurality of through holes, and a third plurality of through holes;

a third plate, defining a fourth plurality of through holes matched with the third plurality of through holes;

an item of baggage constructed at least partially of a flexible material;

a plurality of permanent fasteners; and a plurality of removable fasteners;

wherein:

the first plate and the second plate are aligned such that each through hole of the first plurality of through holes is aligned with a respective through hole of the second plurality of through holes;

the second plate and the third plate aligned such that each through holes of the third plurality of through holes is aligned with a respective through hole of the fourth plurality of through holes;

the first plate and the second plate are oriented about the flexible material such that the first plate is on a first side of the flexible material and the second plate is on a second side, opposite to the first side, of the flexible material;

the permanent fasteners perforate the flexible material, and are disposed in corresponding through holes of the first plurality of through holes and the second plurality of through holes, and clamp the first plate and the second plate such that the flexible material is securely held between the first plate and the second plate, such that the first plate and second plate are secured to the item of baggage; and the removable fasteners are disposed in corresponding through holes of the third plurality of through holes and the fourth plurality of through holes, and secure the third plate to the second plate, such that the first plate, the second plate, and the third plate are secured to the item of baggage.

2. The device of claim 1, wherein the first plate, the second plate, or the third plate, is made of a rigid material, selected from a group consisting of aluminum, brass, steel, bronze, plastic, wood, bamboo, ceramic, and carbon fiber.

3. The device of claim 1, wherein a ratio of a distance between a center point of a given though hole of the first plurality of through holes and an edge of the first plate nearest the given through hole, and a thickness of the first plate is between 1:2 and 1:10.

4. The device of claim 1, wherein a ratio of a distance between a center point of a given through hole of the third plurality of through holes and an edge of the second plate nearest the given through hole, and a thickness of the second plate is between 1:2 and 1:15.

5. The device of claim 1, wherein a ratio of a distance between a center point of a given through hole of the first plurality of through holes and an edge of the first plate nearest the given through hole of the first plurality of through holes, to a distance between a center point of a given through hole of the third plurality of through holes and an edge of the second plate nearest the given through hole of the second plurality of through holes is between 1:1 and 1:10.

6. The device of claim 1, wherein the third plate bears symbols, images or words that are embossed, printed, inlaid, etched or imposed on a surface thereof.

7. The device of claim 1, further comprising a plurality of indicia plates, including the third plate, that are structurally compatible with the second plate and the removable fasteners, and wherein each indicia plate of the plurality of indicia plates bears unique indicia compared to other indicia plates of the plurality of indicia plates.

8. The device of claim 1, wherein the item of baggage is a bag, a purse, a piece of luggage, a fanny pack, or a wallet.

9. A kit comprising:

a first plate, defining a first plurality of through holes;

a second plate, defining a second plurality of through holes matched with the first plurality of through holes, and a third plurality of through holes;

a third plate, defining a fourth plurality of through holes matched with the third plurality of through holes;

a fourth plate, defining a fifth plurality of through holes matched with the third plurality of through holes;

a plurality of permanent fasteners;

a plurality of removable fasteners; wherein the first plate and the second plate are configured such that when edges of each are aligned with one another, each of the through holes in the first plurality is aligned with a respective through hole of the second plurality;

the second plate and the third plate are configured such that when edges of each aligned with one another, each of the through holes of the third plurality are aligned with a respective through hole of the fourth plurality;

the permanent fasteners are configured to rigidly secure the first plate to the second plate through an intervening flexible material when disposed in the first plurality and second plurality of through holes, and clamp the first and second plates such that the intervening flexible material in between the first and second plates is securely held between the first and second plates; and the removable fasteners are configured to rigidly secure the third plate or the fourth plate to the second plate via the third plurality of through holes and a respective one of the fourth plurality of through holes or the fifth plurality of through holes.

10. The kit of claim 9, wherein the first plate, the second plate, the third plate, or the fourth plate, is made of a rigid material, selected from a group consisting of aluminum, brass, steel, bronze, plastic, wood, bamboo, ceramic, and carbon fiber.

11. The kit of claim 9, wherein a ratio of a distance between a center point of a given though hole of the first plurality of through holes and an edge of the first plate nearest the given through hole, and a thickness of the first plate is between 1:2 and 1:10.

12. The kit of claim 9, wherein a ratio of a distance between a center point of a given through hole of the third plurality of through holes and an edge of the second plate nearest the given through hole, and a thickness of the second plate is between 1:2 and 1:15.

13. The kit of claim 9, wherein a ratio of a distance between a center point of a given through hole of the first plurality of through holes and an edge of the first plate nearest the given through hole of the first plurality of through holes, to a distance between a center point of a given through hole of the third plurality of through holes and an edge of the second plate nearest the given through hole of the second plurality of through holes is between 1:1 and 1:10.

14. An item of baggage, comprising:

a first clamping plate;

a second clamping plate;

an indicia plate;

a plurality of permanent fasteners;

a plurality of removable fasteners; and a flexible material;

wherein:

the first clamping plate and the second clamping plate are clamped about a section of the flexible material, via clamping action produced by the permanent fasteners that secure the first clamping plate to the second clamping plate through the flexible material;

the indicia plate is fastened to the second clamping plate with the removable fasteners; and a ratio of a distance between a given permanent fastener and an edge of the first clamping plate nearest the given permanent fastener, and a thickness of the first clamping plate is between 1:2 and 1:10.

15. The item of baggage of claim 14, wherein, the second clamping plate, or the indicia plate, is made of a rigid material, such as aluminum, brass, steel, bronze, plastic, wood, bamboo, ceramic, or carbon fiber.

16. The item of baggage of claim 14, wherein the item of baggage is a bag, a purse, a piece of luggage, a fanny pack, or a wallet.

17. The item of baggage of claim 14 wherein the flexible material is selected from a group consisting of: leather, leatherette, canvas, denim, cotton, tweed, burlap, velvet, felt, polyester, nylon, wool, bamboo fiber, silk, fur, neoprene, and vinyl fabrics.

18. The item of baggage of claim 14, wherein the indicia plate is selectively removable from the second clamping plate via removal of the plurality or removable fasteners from paired through holes in the indicia plate and the second clamping plate.

19. The item of baggage of claim 14, wherein the first clamping plate includes a first plurality of screw holes aligned with a second plurality of screw holes defined through the second clamping plate, wherein a diameter of the first plurality of screw holes is larger than a gauge of the removable fasteners and are not threaded.

20. The item of baggage of claim 14, wherein a ratio of a thickness of the first clamping plate to a thickness of the second clamping plate is between 1:1 and 1:4.

* * * * *